United States Patent
Park

(10) Patent No.: US 10,094,436 B2
(45) Date of Patent: Oct. 9, 2018

(54) METHOD OF CONTROLLING DAMPER CLUTCH THROUGH LEARNING

(71) Applicant: HYUNDAI MOTOR COMPANY, Seoul (KR)

(72) Inventor: Jun Sung Park, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/597,580

(22) Filed: May 17, 2017

(65) Prior Publication Data

US 2017/0248179 A1     Aug. 31, 2017

Related U.S. Application Data

(63) Continuation-in-part of application No. 15/094,168, filed on Apr. 8, 2016.

(30) Foreign Application Priority Data

Nov. 10, 2015    (KR) ........................ 10-2015-0157509

(51) Int. Cl.
*F16H 61/14*       (2006.01)
*F16D 48/06*       (2006.01)
*F16D 48/02*       (2006.01)
*F16H 45/02*       (2006.01)
*F16H 61/00*       (2006.01)

(52) U.S. Cl.
CPC ........... *F16D 48/066* (2013.01); *F16D 48/02* (2013.01); *F16H 61/143* (2013.01); *F16D 2500/1026* (2013.01); *F16D 2500/30406* (2013.01); *F16D 2500/50245* (2013.01); *F16D 2500/70217* (2013.01); *F16D 2500/70426* (2013.01); *F16H 45/02* (2013.01); *F16H 2061/0087* (2013.01); *F16H 2061/145* (2013.01)

(58) Field of Classification Search
None
See application file for complete search history.

(56) References Cited

U.S. PATENT DOCUMENTS 5,213,186 A * 5/1993 Murata ................. F16H 61/143
                                                                                                       192/3.33
5,562,571 A * 10/1996 Maruyama ............ B60W 30/18
                                                                                                       477/174

(Continued)

FOREIGN PATENT DOCUMENTS

JP     2004-150548 A    5/2004
JP     2008-121750 A    5/2008

(Continued)

*Primary Examiner* — Justin Holmes
(74) *Attorney, Agent, or Firm* — Brinks Gilson & Lione

(57) ABSTRACT

Disclosed is a method of controlling a damper clutch through learning. A controller determines whether a driving condition of a vehicle is a condition where a predetermined selected fluid pressure value is desired. When necessary learning conditions are satisfied, the controller applies a control current for realizing a relevant fluid pressure to the solenoid valve. The controller updates the control current of the solenoid valve to an appropriate value based on response of the damper clutch. Thereafter, the controller controls the solenoid valve based on the updated control current.

7 Claims, 6 Drawing Sheets

(56) References Cited

U.S. PATENT DOCUMENTS

| | | | | |
|---|---|---|---|---|
| 2004/0005956 | A1* | 1/2004 | You | F16H 61/0021 477/161 |
| 2005/0143218 | A1* | 6/2005 | Yu | F16H 61/0437 477/65 |
| 2006/0237275 | A1* | 10/2006 | Fujita | F16H 61/143 192/3.29 |
| 2008/0119327 | A1* | 5/2008 | Kitaori | F16H 61/0213 477/120 |
| 2008/0271966 | A1* | 11/2008 | Simpson | F16H 61/62 192/3.33 |
| 2009/0048747 | A1* | 2/2009 | Stridsberg | B60K 6/387 701/55 |
| 2013/0311056 | A1* | 11/2013 | Shinojinna | F16H 61/6648 701/58 |
| 2014/0316625 | A1* | 10/2014 | Yoshikawa | B60W 20/40 701/22 |

FOREIGN PATENT DOCUMENTS

| | | |
|---|---|---|
| JP | 2012-47313 A | 3/2012 |
| JP | 2013-108593 A | 6/2013 |
| JP | 2014-43914 A | 3/2014 |
| KR | 10-0838119 | 6/2008 |

\* cited by examiner

METHOD OF CONTROLLING DAMPER CLUTCH THROUGH LEARNING

PRIORITY STATEMENT

This application is a continuation-in-part application of non-provisional U.S. patent application Ser. No. 15/094,168, filed on Apr. 8, 2016, which claims priority to and the benefit of Korean Patent Application No. 10-2015-0157509, filed Nov. 10, 2015, which are incorporated herein by reference.

FIELD

The present disclosure relates generally to a method of controlling a damper clutch of a torque converter.

BACKGROUND

The statements in this section merely provide background information related to the present disclosure and may not constitute prior art.

Some transmissions of a vehicle use torque converters equipped with damper clutches, and thus an engine coupled to a torque converter is directly coupled to a turbine of the torque converter, whereby fuel efficiency of vehicles may be enhanced.

This damper clutch controls a solenoid valve, which controls fluid pressure supplied to the damper clutch, by applying a control current to the solenoid valve. In a transmission assembly line, fluid pressure being supplied to the damper clutch is measured in regard to a control current being applied to the solenoid valve, and the measured fluid pressure is compared with predetermined regular fluid pressure, whereby quality of the transmission is determined.

Also, a controller of a vehicle obtains a relation between fluid pressure to be provided to the damper clutch and a control current of the solenoid valve to obtain the fluid pressure as a map, and controls the damper clutch by using the map.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a method of controlling a damper clutch through learning. According to the method, it is unnecessary to determine whether a fluid pressure of a damper clutch depending on a control current is appropriate in a transmission assembly line. Also, a relation between the fluid pressure of the damper clutch and the control current of a solenoid valve may be obtained through learning while a torque converter is mounted in a vehicle, whereby manufacturing costs may be saved due to a reduction in test process of the transmission assembly line, and appropriate control performance of the damper clutch applied to the vehicle may be secured.

In one aspect of the present disclosure, a method of controlling a damper clutch through learning may include: selecting, by a controller at a learning target selecting step, a selected fluid pressure value from a plurality of predetermined selected fluid pressure values as a learning target fluid pressure value when a driving condition of a vehicle where the selected fluid pressure value is required occurs; obtaining, by the controller at a current obtaining step, a control current of a solenoid valve from a control map, the control current being required to apply a fluid pressure related to the learning target fluid pressure value to the damper clutch; comparing, by the controller at a comparing step, at least one of a maximum slip level of the damper clutch and a target reach time for the damper clutch to reach a target slip level with at least one of a reference maximum slip level and a reference target reach time that are predetermined for the driving condition while controlling the solenoid valve with the control current obtained at the current obtaining step; correcting, by the controller at a learning step, the control current for the learning target fluid pressure value in the control map based on a difference that is a result of performing the comparing step, and updating control currents for fluid pressure values between a fluid pressure value for which the control current is corrected and another selected fluid pressure value adjacent thereto through interpolation; and controlling, by the controller at a learning applying step after the learning step, the solenoid valve by selecting a control current of the solenoid valve for a new fluid pressure value that is required according to the driving condition of the vehicle, from an updated control map.

The plurality of selected fluid pressure values may be at least two fluid pressure values that are separated from each other and selected in an entire range of the fluid pressure provided to the damper clutch by controlling the solenoid valve.

The plurality of selected fluid pressure values may be fluid pressure values respectively required for at least two driving conditions among tip-in, middle opening ratio kickdown, high opening ratio kickdown, tip-out, and lift-foot-up conditions of the vehicle.

The plurality of selected fluid pressure values may include a selected fluid pressure value for learning a hysteresis effect that occurs when applying the fluid pressure again after starting to release the fluid pressure of the damper clutch.

The control map may store two control currents related to the selected fluid pressure values for learning the hysteresis effect. One of the two control currents may be related to a condition where a steady-state response of the damper clutch occurs since the fluid pressure is applied again before completely releasing the fluid pressure after starting to release the fluid pressure of the damper clutch. A remaining one of the two control currents may be related to a condition where a transient response of the damper clutch occurs since the fluid pressure is applied again after completely releasing the fluid pressure of the damper clutch.

At the learning step, as the result of performing the comparing step, when the maximum slip level of the damper clutch is higher than the reference maximum slip level, the control current for the learning target fluid pressure value may be corrected to be higher based on the difference between the maximum slip level of the damper clutch and the reference maximum slip level, and when the maximum slip level of the damper clutch is lower than the reference maximum slip level, the control current may be corrected to be lower based on the difference.

At the learning step, as the result of performing the comparing step, when the target reach time of the damper clutch is longer than the reference target reach time, the control current for the learning target fluid pressure value may be corrected to be higher based on the difference between the target reach time of the damper and the reference target reach time, and when the target reach time of the damper clutch is shorter than the reference target reach time, the control current may be corrected to be lower based on the difference.

According to the present disclosure, it is unnecessary to determine whether a fluid pressure of a damper clutch depending on a control current is appropriate in a transmission assembly line. Also, a relation between the fluid pressure of the damper clutch and the control current of a solenoid valve may be obtained through learning while a torque converter is mounted in a vehicle, whereby manufacturing costs may be saved due to a reduction in test process of the transmission assembly line, and appropriate control performance of the damper clutch applied to the vehicle may be secured.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
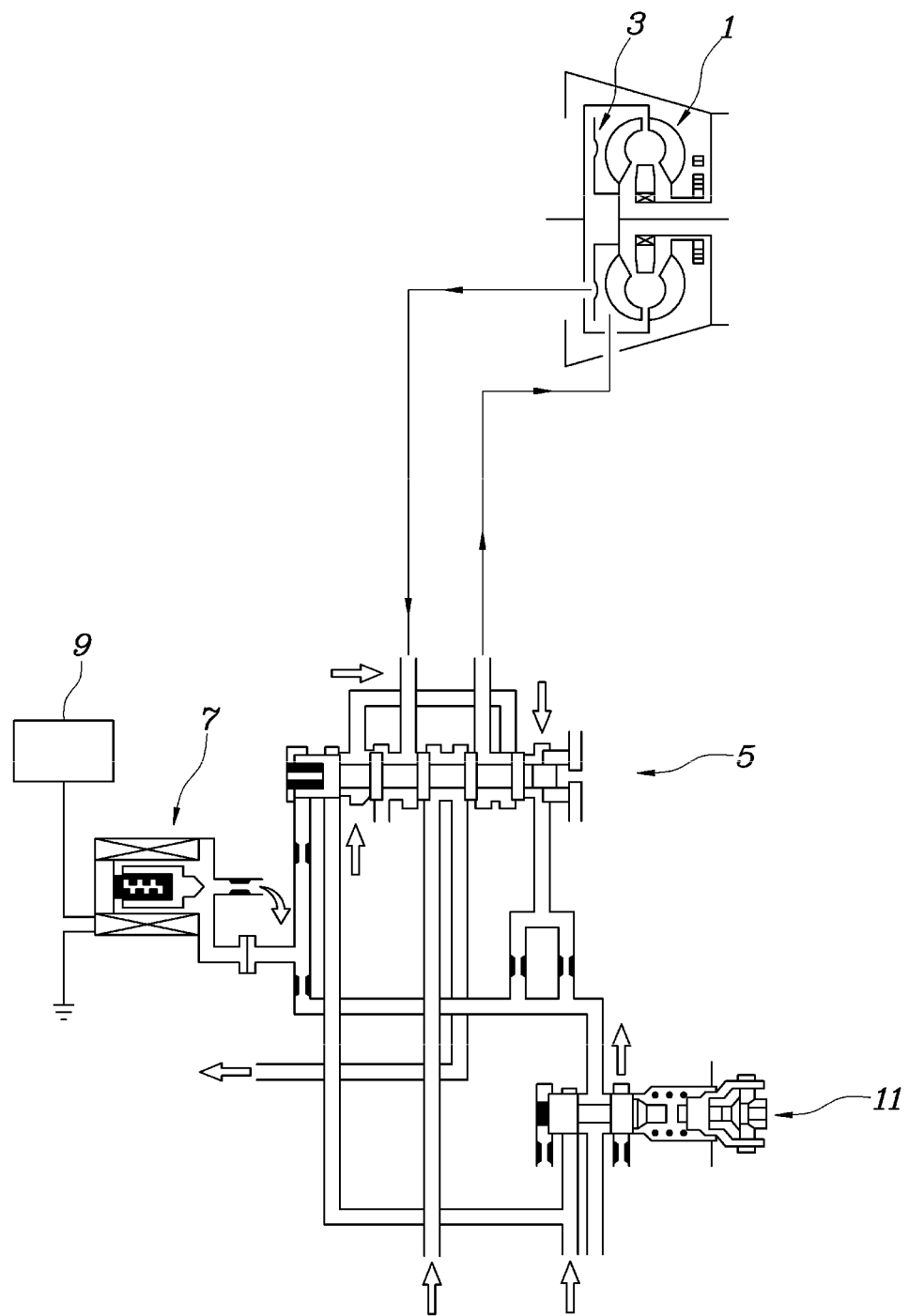
FIG. 1 is a view showing an example of connection between a damper clutch to which the present disclosure may be applied and a solenoid valve.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a damper clutch 3 of a torque converter 1 to which the present disclosure may be applied; a damper clutch control valve 5 for controlling the damper clutch 3; a solenoid valve 7 ultimately adjusting fluid pressure supplied to the damper clutch 3 by controlling the damper clutch control valve 5; and a controller 9 applying a control current to control the solenoid valve 7.

FIG. 1 also shows a pressure reducing valve 11 supplying, to the damper clutch control valve 5, fluid pressure that is reduced in response to receiving line pressure generated by a regulator valve, which is not shown.

Figure 2:
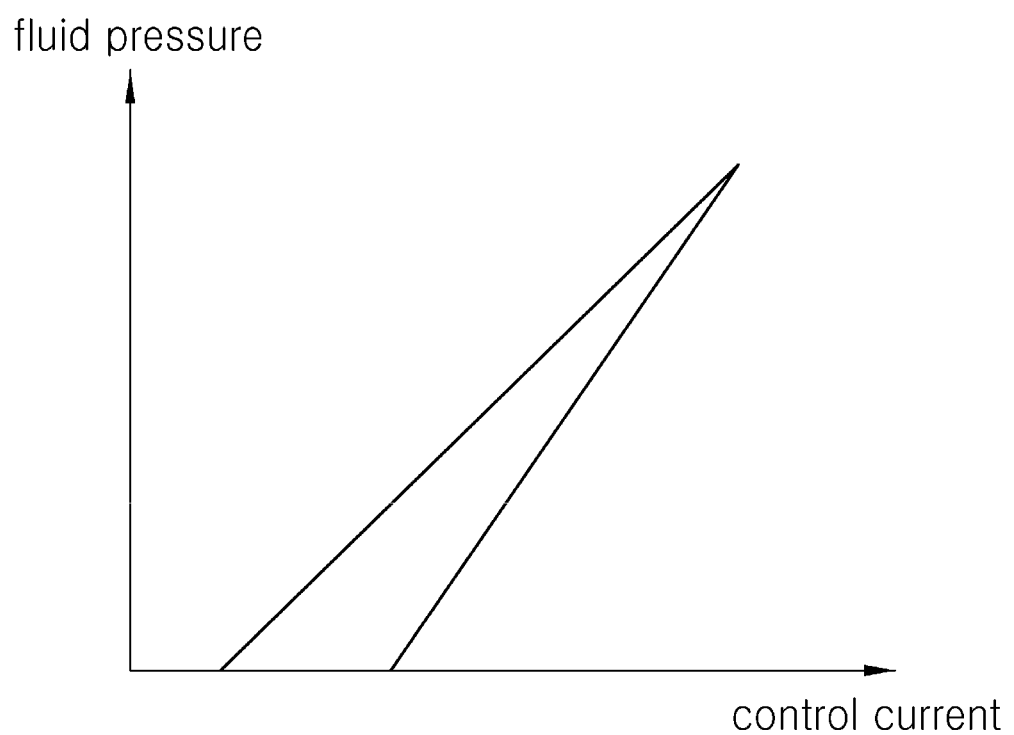
FIG. 2 is a graph of initial state of a control map that may be used in the present disclosure.

FIG. 2 is a graph showing a relation between fluid pressure to be provided to the damper clutch 3 and a control current to be applied to the solenoid valve 7 to obtain the fluid pressure. The graph is stored as a control map in a storage device that the controller 9 may have access to.

States of the fluid pressure and the control current shown in FIG. 2 are initial values input in the storage device. The initial values may be average values that are previously determined from repetitive experiments and interpretations in respect of a combination of the damper clutch 3 and the solenoid valve 7.

Logically, in a vehicle mounting the above-described combination of the damper clutch 3 and the solenoid valve 7, when the controller 9 controls the solenoid valve 7 by using a control map including the average values obtained from repetitive experiments and interpretations, precise fluid pressure should be supplied to the damper clutch 3 in response thereto. However, we have discovered that since there are deviations in manufacturing and assembling components of the transmission including the damper clutch and the solenoid valve, fluid pressure being actually supplied to the damper clutch may differ in spite of the same control current being applied to the solenoid valve.

In one form of the present disclosure, to prepare the above-described condition, in initially assembling and manufacturing a transmission and a vehicle, the control map composed of the initial values, which are the average values as shown in FIG. 2, is provided to the vehicle. Therefore, when the control current is applied to the solenoid valve, precise fluid pressure may be applied to the damper clutch in response thereto without correction, which means a normal condition pursued in as many vehicle as possible. Also, when a condition where abnormal fluid pressure is applied to the damper clutch occurs due to various reasons in regard to the control current applied to the solenoid valve, the condition is automatically learned to correct the control current. Accordingly, the controller may precisely control the damper clutch through the solenoid valve.

Figure 3:
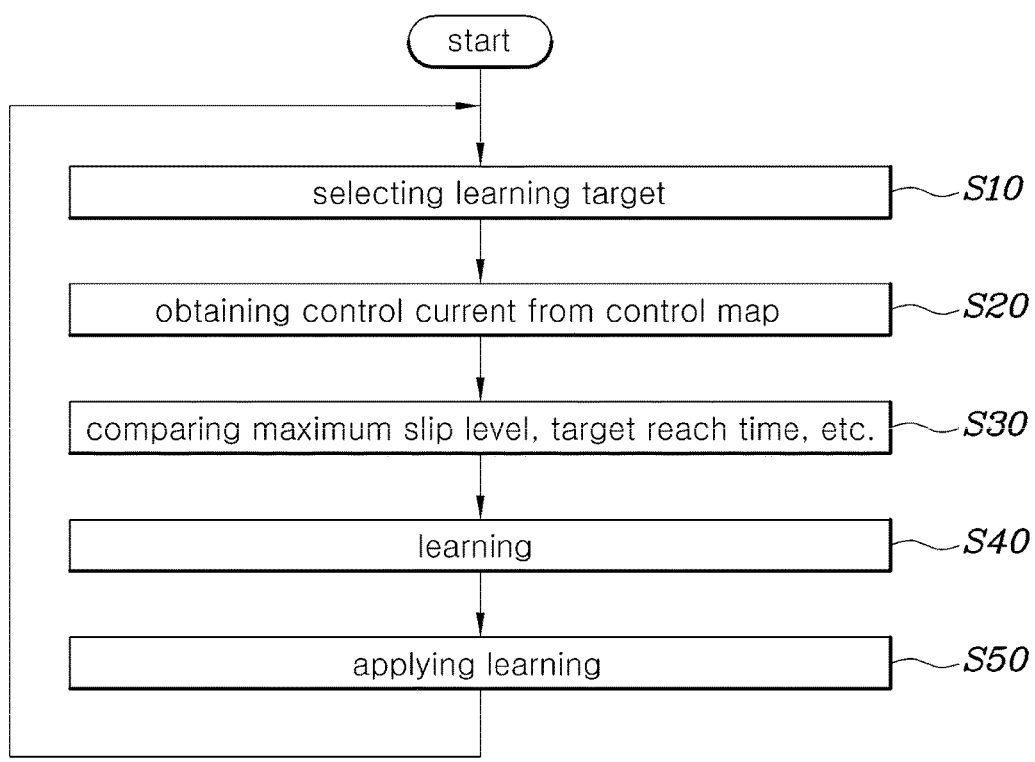
FIG. 3 is a flowchart showing a method of controlling a damper clutch through learning in one form of the present disclosure.

FIG. 3 is a flowchart showing a method of controlling the damper clutch through learning in one form of the present disclosure. According to the form, the method of controlling the damper clutch through learning includes: selecting, by a controller 9 at learning target selecting step S10, a selected fluid pressure value from a plurality of predetermined selected fluid pressure values as a learning target fluid pressure value when a driving condition of a vehicle where the selected fluid pressure value is desired occurs; obtaining, by the controller 9 at current obtaining step S20, a control current of a solenoid valve 7 from a control map, the control current being desired to apply a fluid pressure related to the learning target fluid pressure value to the damper clutch 3; comparing, by the controller 9 at comparing step S30, at least one of a maximum slip level of the damper clutch 3 and a target reach time for the damper clutch 3 to reach a target slip level with at least one of a reference maximum slip level and a reference target reach time that are predetermined for the driving condition while controlling the solenoid valve with the control current obtained at the current obtaining step S20; correcting, by the controller 9 at learning step S40, the control current for the learning target fluid pressure value in the control map based on a difference that is a result of performing the comparing step S30, and updating control currents for fluid pressure values between the fluid pressure value for which the control current is corrected and another selected fluid pressure value adjacent thereto through interpolation; and controlling, by the controller 9 at learning applying step S50 after the learning step S40, the solenoid valve 7 by selecting a control current of the solenoid valve 7 for a new fluid pressure value that is desired according to the driving condition of the vehicle, from the updated control map.

Here, the controller 9 determines whether the driving condition of the vehicle is a condition where a predetermined selected fluid pressure value is desired. When desired learning conditions are satisfied, the controller applies a control current for realizing the relevant fluid pressure (learning target fluid pressure) to the solenoid valve 7. The controller updates the control current of the solenoid valve 7 to an appropriate value based on response (a maximum slip level and a target reach time) of the damper clutch 3. Thereafter, the controller controls the solenoid valve 7 based on the updated control current.

Particularly, when performing learning on one selected fluid pressure value, in regard to fluid pressure values between the selected fluid pressure value and another selected fluid pressure value adjacent thereto, the control current is updated by interpolation as described above.

In one form of the present disclosure, at least two representative fluid pressure values in an entire range of fluid pressure to be applied to the damper clutch 3 are selected as the selected fluid pressure values, and thus control data that is appropriate in the entire range of fluid pressure may be obtained with learning of only the selected fluid pressure values.

Accordingly, it is desirable that the plurality of selected fluid pressure values are at least two fluid pressure values that are separated from each other and selected in an entire range of the fluid pressure provided to the damper clutch 3 by controlling the solenoid valve 7.

Particularly, it is desirable that the plurality of selected fluid pressure values are fluid pressure values respectively desired for at least two driving conditions among tip-in, middle opening ratio kickdown, high opening ratio kickdown, tip-out, and lift-foot-up conditions of the vehicle, which are representative conditions that may occur during running a vehicle.

Tip-in means a condition where a driver starts operating the acceleration pedal, namely, a condition where an operation level of the acceleration pedal is less than about 20%, and the transmission is not caused gear shift.

Kickdown means a condition where gear shift occurs from a current gear stage to a lower gear stage in the transmission by operating the acceleration pedal. Middle opening ratio kickdown may be determined as a condition where the operation level of the acceleration pedal ranges about 30 to 60%, and high opening ratio kickdown may be determined as a condition where the operation level of the acceleration pedal is equal to or greater than 60%.

Tip-out may be a condition where the driver stepping on the acceleration pedal starts stepping off the acceleration pedal and thus the operation level of the acceleration pedal become 0%, namely, gear shift does not occur. In contrast, lift-foot-up means a condition where gear shift occurs to a higher gear stage due to the operation level of the acceleration pedal of 0%.

In the meantime, it is desirable that the plurality of selected fluid pressure values includes a selected fluid pressure value for learning a hysteresis effect that occurs when applying the fluid pressure again after starting to release the fluid pressure of the damper clutch 3.

Referring to FIG. 2, the graph of the fluid pressure in regard to the control current is indicated by two straight lines. The straight line on the right side indicates a condition when the damper clutch 3 is controlled to increase the fluid pressure. The straight line on the left side indicates a condition when the damper clutch 3 is controlled to decrease the fluid pressure.

That is, even though the same control current is applied to the solenoid valve, the condition where the damper clutch 3 is controlled to increase the fluid pressure obtains different fluid pressure from the condition where the damper clutch is controlled to release the fluid pressure. Therefore, with consideration of the above-described conditions, the controller 9 may more precisely control the damper clutch 3.

It is desirable to set the selected fluid pressure value for learning the hysteresis effect to a relatively low fluid pressure value, for example, about 0.4 to 0.5 bar. As shown in the graph of FIG. 2, when the fluid pressure is low, deviation of the control current caused by hysteresis effect is large. Therefore, it is possible to effectively apply the occurrence of the deviation to control map.

Particularly, it is desirable that the control map stores two control currents related to selected fluid pressure values for learning the hysteresis effect.

One of the two control currents is related to a condition where a steady-state response of the damper clutch 3 occurs since the fluid pressure is applied again before completely releasing the fluid pressure after starting to release the fluid pressure of the damper clutch. A remaining one of the two control currents is related to a condition where a transient response of the damper clutch 3 occurs since the fluid pressure is applied again after completely releasing the fluid pressure of the damper clutch 3.

That is, in a condition where the fluid pressure of the damper clutch 3 is completely released, and next, the fluid pressure is applied again, transient phenomena occurs such as fill time which is a time to fill the damper clutch 3 with the fluid pressure, etc. Thus, the fluid pressure is non-linear in response to the increase in the control current. This condition is controlled by being distinguished from the condition where the steady-state response occurs, whereby the damper clutch 3 may be appropriately controlled.

For example, in the condition where the control current of the solenoid valve 7 is controlled to be equal to or less than zero, and next the fluid pressure is applied to the damper clutch 3 again, the controller 9 rapidly applies the fluid pressure to the damper clutch 3 by using the control current for the transient response of the damper clutch 3. In the condition where the control current is not controlled to be equal to or less than zero in spite of the same fluid pressure being applied to the damper clutch 3, the controller uses the control current for the steady-state response, whereby the damper clutch 3 may be precisely controlled.

In performing the learning target selecting step S10, when the condition where one of the previously selected fluid pressure values is desired occurs, the controller 9 identifies whether the learning conditions are satisfied before selecting the selected fluid pressure value as a learning target fluid pressure value. Accordingly, only when all learning conditions are satisfied, the learning step S40 may be performed.

That is, the learning step S40 may be performed, when the fluid pressure value desired for the damper clutch 3 is one of the selected fluid pressure values. Also, it is determined whether engine cooling water temperature, automatic transmission fluid (ATF) temperature, etc. indicate that the vehicle is driving in a normal condition, whether the vehicle speed is at a general vehicle speed level equal to or greater than 70 to 80 Km/h and equal to or less than 120 Km/h, and whether an inclination of the current road is at a normal level and not an excessive level. Only when the vehicle is in a normal condition, the vehicle speed is in a range of the general vehicle speed, and the inclination of the road is at a normal level, the learning step S40 may be performed. Accordingly, it is possible to inhibit or prevent unnecessary learning, and to secure reliability and stability of learning.

At the learning step S40, as the result of performing the comparing step S30, when the maximum slip level of the damper clutch 3 is higher than the reference maximum slip level, the control current for the learning target fluid pressure value may be corrected to be higher based on the difference. When the maximum slip level of the damper clutch is lower than the reference maximum slip level, the control current may be corrected to be lower based on the difference.

Also, at the learning step S40, as the result of performing the comparing step S30, when the target reach time of the damper clutch 3 is longer than the reference target reach time, the control current for the learning target fluid pressure value may be corrected to be higher based on the difference. When the target reach time of the damper clutch is shorter than the reference target reach time, the control current may be corrected to be lower based on the difference.

Also, at the learning step S40, the maximum slip level and the target reach time are considered, and the control current may be corrected based on the consideration.

Here, it is desirable that a correction level of the control current based on the difference between the maximum slip level and the reference maximum slip level and a correction level of the control current based on the difference between the target reach time and the reference target reach time use correction maps for relevant conditions.

Figure 4:
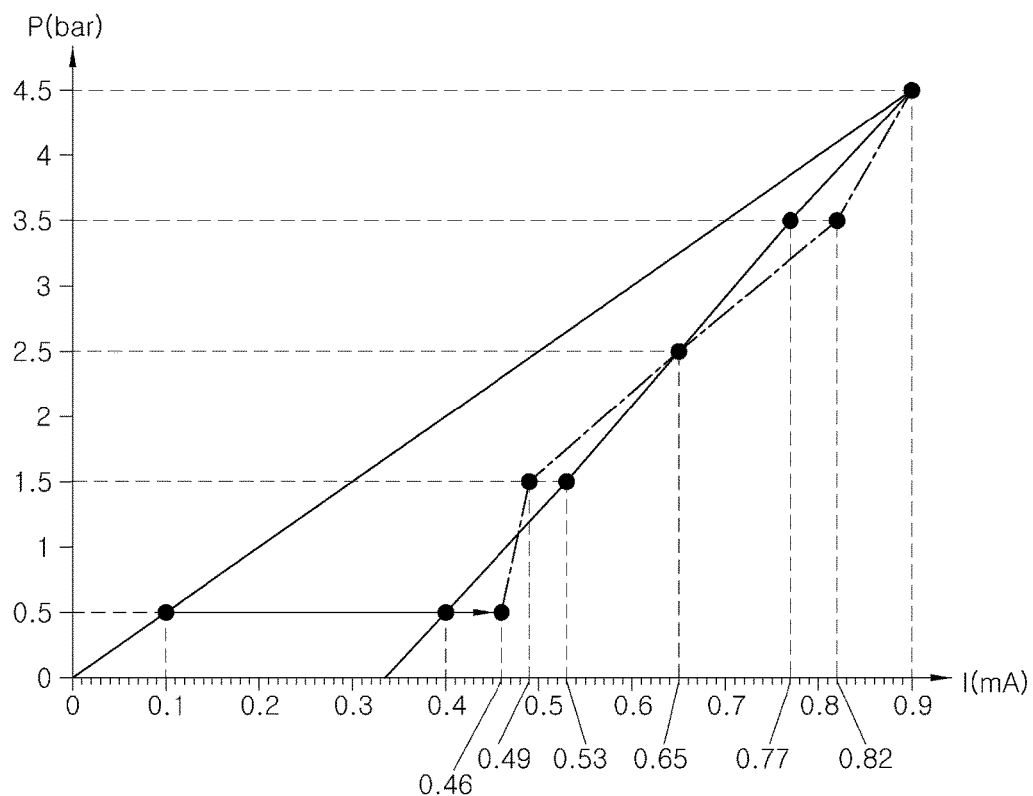
FIG. 4 is a graph showing an example of learning in one form of the present disclosure.

FIG. 4 is a graph showing an example of learning in one form of the present disclosure. The graph changes from the graph in a state of FIG. 2 as learning progresses. That is, the graph shows a condition where learning is performed on the control map. The learning contents of FIG. 4 are described as a table as follows, which is an example of the control map actually stored in storage device.

occurs in the damper clutch 3. In order to remove the slip, the controller 9 calculates the fluid pressure of the damper clutch 3 as approximately 1.5 bar according to the tip-in condition. Accordingly, when the solenoid valve 7 is controlled with approximately 0.53 mA, the slip is decreased after being increased based on a reference movement of an engine RPM.

In this case, learning is not required, and the control current of the control map is maintained.

However, in the same condition as described above, the engine RPM movement may occur in state ① or ②. In the case of ①, excessive fluid pressure of equal to or greater than approximately 1.5 bar may occur in regard to the control current of approximately 0.53 mA. In the case of ②, relatively inadequate fluid pressure of less than approximately 1.5 bar may occur.

In the above-described cases, there are differences between the maximum slip level and the target reach time, and those of the reference movement of the engine RPM. A correction value for correcting the control current is determined based on the differences.

For example, in the case of the reference movement of the engine RPM, when the maximum slip level is approximately 10 RPM, the reference maximum slip level is 10 RPM. In the case of ①, when the maximum slip level is approximately 3 RPM, a correction value of 0.04 mA corresponding to 7 RPM which is the difference is obtained from the predetermined correction map. The correction value is sub-

| | Driving condition | | | | | | | | | | |
|---|---|---|---|---|---|---|---|---|---|---|---|
| | Hysteresis | | | Tip-in | | Middle opening ratio kickdown | | High opening ratio kickdown | | | |
| Fluid pressure (bar) | 0 | | 0.5 | 1 | 1.5 | 2 | 2.5 | 3 | 3.5 | 4 | 4.5 |
| Initial value (mA) | 0 | 0.1 | 0.4 | 0.6 | 0.465 | 0.53 | 0.59 | 0.65 | 0.71 | 0.77 | 0.835 | 0.9 |
| Learning value (mA) | 0 | | 0.46 | 0.58 | 0.475 | 0.49 | 0.57 | 0.65 | 0.74 | 0.82 | 0.86 | 0.9 |

In the control map as the table, the selected fluid pressure values may be approximately 0.5 bar of hysteresis, approximately 1.5 bar of thip-in, approximately 2.5 bar of middle opening ratio kickdown, and approximately 3.5 bar of high opening ratio kickdown.

For example, in conditions where the engine cooling water temperature, the ATF temperature, the vehicle speed, the road inclination, etc. are satisfied during driving a vehicle, when the driver steps on the acceleration pedal and tip-in driving condition occurs, and the calculated and desired fluid pressure of the damper clutch 3 is approximately 1.5 bar which is the selected fluid pressure, the controller 9 selects approximately 1.5 bar as the learning target fluid pressure value.

The controller 9 obtains an initial value of the control current of approximately 0.53 mA, which is applied to the solenoid valve 7, corresponding to approximately 1.5 bar from the control map, and controls the solenoid valve 7 by using the control current. The controller measures the maximum slip level and the target reach time of the damper clutch 3, and compares the maximum slip level and the target reach time with the reference maximum slip level and the reference target reach time.

Figure 5:
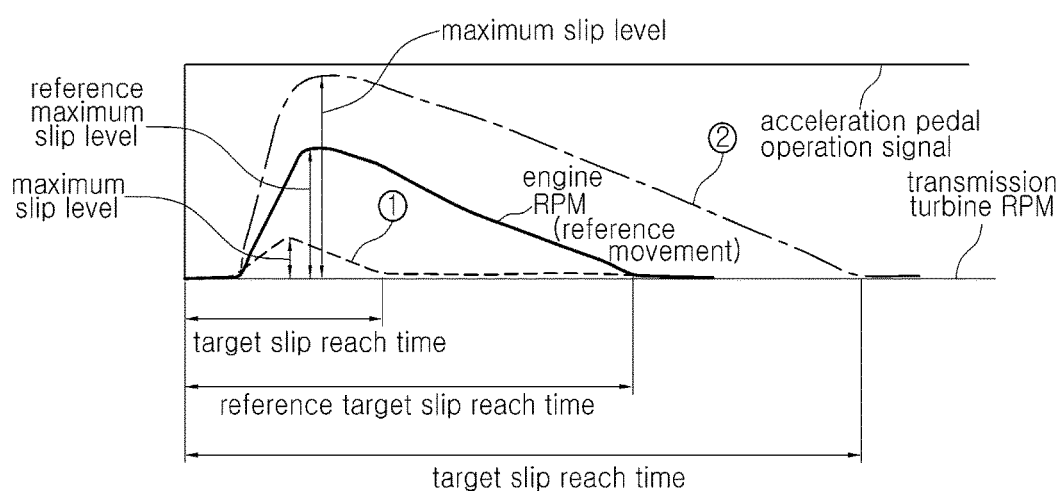
FIG. 5 is a graph showing a principle of learning in a condition of tip-in in one form of the present disclosure.

That is, referring to FIG. 5, when the driver starts operating the acceleration pedal, engine torque increases and slip tracted from the initial value of the control current of 0.53 mA to update a learning value to 0.49 mA. FIG. 4 and the table relate to this case.

Here, when the maximum slip level is approximately 6 RPM and thus, the difference with the reference maximum slip level is calculated as approximately 4 RPM, a correction value of 0.02 mA may be obtained from the correction map to correct the learning value to 0.51 mA.

In contrast, in the case of ②, when the maximum slip level is approximately 20 RPM and thus, the difference with the reference maximum slip level is approximately 10 RPM, which means the fluid pressure is insufficient by 10 RPM, the correction value of 0.05 mA corresponding to the difference may be obtained from the correction map. The correction value is added to the initial value of the control current of 0.53 mA to update the learning value to 0.58 mA.

The above-described obtaining and storing of the correction value may be performed by comparing the target reach time with the reference target reach time. Here, the target reach time means a time for the slip level of the damper clutch 3 to reach a target slip level and thus, control is completed. When the target reach time is longer than the reference target reach time that is set based on the reference movement of the engine RPM, the control current is corrected to be higher based on the time difference and learning is performed. When the target reach time is shorter than the reference target reach time, the control current is corrected to be lower based on the time difference and learning is performed. Accordingly, when the next time control is performed in the same condition, the target reach time is close to the reference target reach time.

In the cases of the middle opening ratio kickdown, the high opening ratio kickdown, etc. learning is performed in the similar manner as the tip-in case.

In the meantime, the learning value for the fluid pressure value between the selected fluid pressure values is obtained by interpolation between the selected fluid pressure value on which learning is performed as described above, and a selected fluid pressure value adjacent thereto.

As an example of this, fluid pressure values of 1, 2, 3, and 4 bars in the table are obtained by interpolation. For reference, 0 bar and 4.5 bar are respectively the minimum fluid pressure value and the maximum fluid pressure value. The minimum and maximum fluid pressure values are not the selected fluid pressure values. However, when performing learning on the selected fluid pressure value adjacent to the minimum and maximum fluid pressure values, and applying interpolation to the fluid pressure values between the minimum and maximum fluid pressure values, the minimum and maximum fluid pressure values serve as the selected fluid pressure values to obtain the fluid pressure value therebetween.

That is, in a case of the fluid pressure value of 4 bar, when the control current is learned as 0.82 mA in regard to the selected fluid pressure value of 3.5 bar in a condition of high opening ratio kickdown, the learning value is updated to the control current of 0.86 mA by using the learned control current and the control current of 0.9 mA related to the maximum fluid pressure value of 4.5 bar through interpolation.

In the meantime, in the case of tip-out or lift-foot-up, hysteresis learning may be performed. That is, the driver suddenly steps off the acceleration pedal, torque and RPM of the engine decrease. Thus, the controller 9 decreases the fluid pressure of the damper clutch 3 to induce buffer action with slip in the damper clutch 3, and controls the damper clutch 3 to be combined again. Here, hysteresis learning may be performed.

In the graph of FIG. 4 and the table, in a case of learning hysteresis effect, the selected fluid pressure value on which hysteresis learning is performed is determined as 0.5 bar. In the table, three initial values are indicated from the left side in order. The control current for realizing 0.5 bar is 0.1 mA, when the fluid pressure applied to the damper clutch 3 is controlled to be decreased. The control current for realizing the selected fluid pressure value is 0.4 mA in the middle, when the fluid pressure of the damper clutch 3 is controlled to be increased. The initial value for the steady-state response of the damper clutch 3 is 0.4 mA when increasing the fluid pressure of the damper clutch 3 before completely releasing the fluid pressure of the damper clutch 3. The initial value for the transient response is 0.6 mA at the right side when applying the fluid pressure after completely releasing the fluid pressure of the damper clutch 3.

The graph of FIG. 4 indicates a case of steady-state response. When the fluid pressure of the damper clutch 3 is decreased into 0.5 bar by the control current of the solenoid valve 7 of 0.1 mA, and the fluid pressure is controlled to be increased before completely releasing the fluid pressure, similar to the case of tip-in, the maximum slip level and the target reach time of the damper clutch 3 are compared with the reference maximum slip level and the reference target reach time that are previously stored for the reference movement of the engine RPM. Accordingly, the correction value of the control current is obtained from a correction map, and the obtained learning value of the control current is 0.46 mA.

Figure 6:
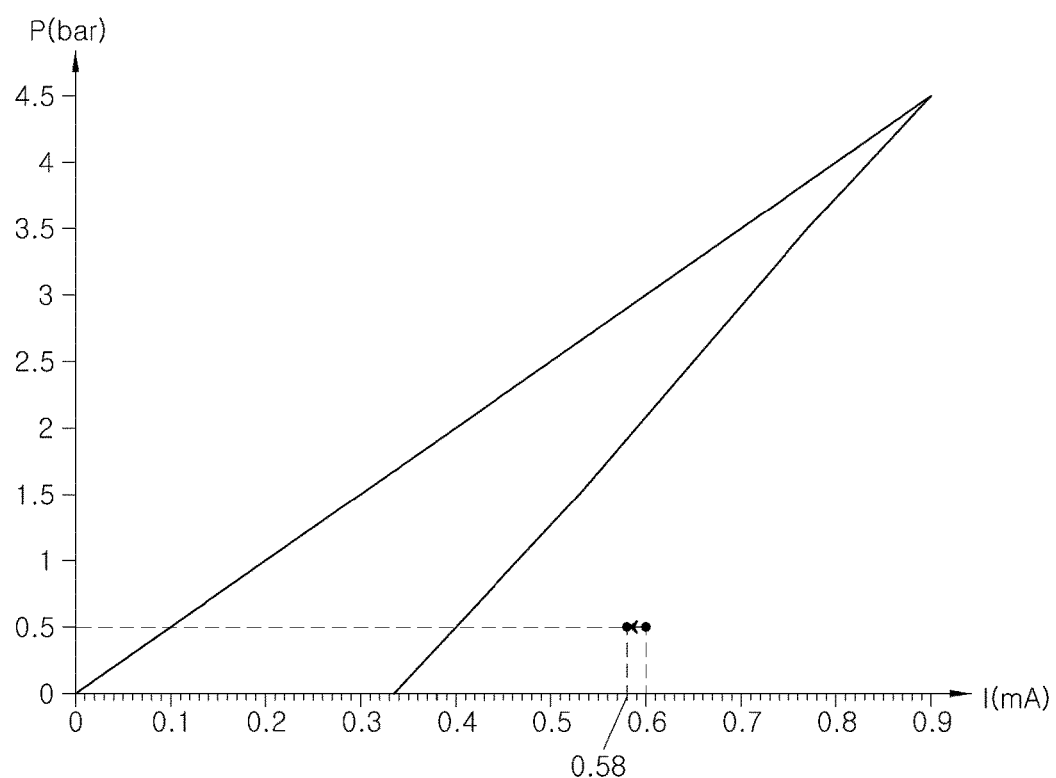
FIG. 6 is a graph showing an example of hysteresis learning for transient response of a damper clutch.

FIG. 6 is a graph showing the transient response of the table. The graph relates to a condition where the control current is applied to the solenoid valve 7 after the fluid pressure of the damper clutch 3 is completely released with the control current of the solenoid valve 7 of zero. From the state of equal to or less than zero, the control current is controlled with the initial value of 0.6 mA to obtain the selected fluid pressure value of 0.5 bar. The maximum slip level and the target reach time of the damper clutch 3 are compared with the reference maximum slip level and the reference target reach time that are previously stored for the reference movement of the engine RPM, whereby a correction value of the control current is obtained from a correction map. Here, the obtained learning value of the control current is 0.58 mA.

Here, two straight lines of FIG. 6 are the same as straight lines indicating initial values of FIG. 4, for reference.

In the case of the hysteresis learning, different learning results are derived depending on whether response of the damper clutch 3 is the steady-state response or the transient response in regard to the same selected fluid pressure value. Therefore, the learning results are separately stored in the table and a storage space, and the damper clutch 3 is controlled by using learning values according to respective related conditions. Accordingly, it is possible to enhance control response and accuracy, and to ultimately enhance driving quality of the vehicle.

For reference, the control current and control duty have similar meaning.

Although an exemplary form of the present disclosure has been described for illustrative purposes, those skilled in the art will appreciate that various modifications, additions and substitutions are possible, without departing from the scope and spirit of the present disclosure.

What is claimed is:

1. A method of controlling a damper clutch through learning, the method comprising:
   selecting, by a controller at a learning target selecting step, a selected fluid pressure value from a plurality of predetermined selected fluid pressure values as a learning target fluid pressure value when a driving condition of a vehicle where the selected fluid pressure value is required occurs;
   obtaining, by the controller at a current obtaining step, a control current of a solenoid valve from a control map, the control current being required to apply a fluid pressure related to the learning target fluid pressure value to the damper clutch;
   comparing, by the controller at a comparing step, at least one of a maximum slip level among slip levels of the damper clutch during controlling the solenoid valve with the control current obtained at the current obtaining step and a target reach time for the damper clutch to reach a target slip level with at least one of a reference slip level and a reference target reach time that are predetermined for the driving condition while controlling the solenoid valve with the control current obtained at the current obtaining step;
   correcting, by the controller at a learning step, the control current for the learning target fluid pressure value in the control map based on a difference that is a result of performing the comparing step, and updating control currents for fluid pressure values between a fluid pressure value for which the control current is corrected and another selected fluid pressure value adjacent thereto through interpolation; and controlling, by the controller at a learning applying step after the learning step, the solenoid valve by selecting a control current of the solenoid valve for a new fluid pressure value that is required according to the driving condition of the vehicle, from an updated control map, supplying a new fluid pressure corresponding to the new fluid pressure value by the solenoid valve to the damper clutch.

2. The method of claim 1, wherein the plurality of selected fluid pressure values are at least two fluid pressure values that are separated from each other and selected in an entire range of the fluid pressure provided to the damper clutch by controlling the solenoid valve.

3. The method of claim 2, wherein the plurality of selected fluid pressure values are fluid pressure values respectively required for at least two driving conditions among tip-in, a first opening ratio kickdown between tip-in and wide open throttle, a second opening ratio kickdown that is wide open throttle, tip-out, and lift-foot-up conditions of the vehicle.

4. The method of claim 3, wherein the plurality of selected fluid pressure values includes a selected fluid pressure value for learning a hysteresis effect that occurs when applying the fluid pressure again after starting to release the fluid pressure of the damper clutch.

5. The method of claim 4, the control map stores two control currents related to the selected fluid pressure value for learning the hysteresis effect, wherein one of the two control currents is related to a condition where a steady-state response of the damper clutch occurs since the fluid pressure is applied again before completely releasing the fluid pressure after starting to release the fluid pressure of the damper clutch, and a remaining one of the two control currents is related to a condition where a transient response of the damper clutch occurs since the fluid pressure is applied again after completely releasing the fluid pressure of the damper clutch.

6. The method of claim 1, wherein at the learning step, as the result of performing the comparing step, when the maximum slip level of the damper clutch is greater than the reference slip level, the control current for the learning target fluid pressure value is corrected to be greater than before based on a difference between the maximum slip level of the damper clutch and the reference slip level, and when the maximum slip level of the damper clutch is less than the reference slip level, the control current is corrected to be less than before based on the difference.

7. The method of claim 1, wherein at the learning step, as the result of performing the comparing step, when the target reach time of the damper clutch is greater than the reference target reach time, the control current for the learning target fluid pressure value is corrected to be greater than before based on a difference between the target reach time of the damper and the reference target reach time, and when the target reach time of the damper clutch is less than the reference target reach time, the control current is corrected to be less than before based on the difference.

* * * * *